(12) United States Patent
Newman et al.

(10) Patent No.: US 8,401,158 B2
(45) Date of Patent: *Mar. 19, 2013

(54) RELEASE LINK TRUNKING FOR IP TELEPHONY

(75) Inventors: Craig E. Newman, Richardson, TX (US); Carolyn Munzing, Richardson, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1121 days.

This patent is subject to a terminal disclaimer.

(21) Appl. No.: 12/340,922

(22) Filed: Dec. 22, 2008

(65) Prior Publication Data

US 2009/0103525 A1    Apr. 23, 2009

Related U.S. Application Data

(63) Continuation of application No. 10/756,399, filed on Jan. 14, 2004, now Pat. No. 7,486,781.

(51) Int. Cl.
*H04M 11/00* (2006.01)

(52) U.S. Cl. ............... 379/88.18; 379/88.13; 379/88.17; 379/93.01; 379/93.12; 379/265.01; 379/265.02; 379/265.09; 370/352; 370/356

(58) Field of Classification Search ............... 379/88.18, 379/88.13, 88.17, 93.01, 93.12, 265.01, 265.02, 379/265.09; 370/352, 356
See application file for complete search history.

(56) References Cited

U.S. PATENT DOCUMENTS

| | | | |
|---|---|---|---|
| 5,101,451 A | 3/1992 | Ash et al. | |
| 5,309,504 A | 5/1994 | Morganstein | |
| 5,345,501 A | 9/1994 | Shelton | |
| 5,652,785 A | 7/1997 | Richardson | |
| 5,787,150 A | 7/1998 | Reiman et al. | |
| 5,790,174 A | 8/1998 | Richard, III et al. | |
| 5,802,526 A | 9/1998 | Fawcett et al. | |
| 5,805,691 A | 9/1998 | Dendi | |
| 5,884,032 A | 3/1999 | Bateman et al. | |
| 5,963,618 A | 10/1999 | Porter | |
| 5,963,633 A | 10/1999 | Dendi | |
| 5,987,118 A | 11/1999 | Dickerman et al. | |
| 6,018,579 A | 1/2000 | Petrunka | |
| 6,049,602 A | 4/2000 | Foladare et al. | |
| 6,097,804 A | 8/2000 | Gilbert et al. | |
| 6,122,364 A | 9/2000 | Petrunka et al. | |
| 6,134,235 A | 10/2000 | Goldman et al. | |
| 6,137,870 A | 10/2000 | Scherer | |
| 6,195,357 B1 | 2/2001 | Polcyn | |

(Continued)

FOREIGN PATENT DOCUMENTS

WO    99/34612    7/1999

OTHER PUBLICATIONS

Schulzrinne, H., "The Session Initiation Protocol: Providing Advanced Telephony Services Across the Internet", Bell Labs Technical Journal, Wiley, CA, vol. 3, No. 4., Oct. 1998, pp. 144-160.

*Primary Examiner* — Quynh Nguyen (57) ABSTRACT

Methods and systems are provided that use resources more efficiently for calls originating and terminating in a first address space that use services in an IP address space. A call is established from an originator in a first address space to an IP device within an IP address space. The IP device sends a message to a switch in the first address space indicating a new destination in the first address space. The established call is released and a second call is established from the originator in the first address space to the new destination in the first address space. In another implementation, a first leg of a call is established to an IP device from a first address space. The IP device establishes a second leg of a call to a destination in the first address space. The calls are bridged and resources released.

20 Claims, 12 Drawing Sheets

U.S. PATENT DOCUMENTS

| | | |
|---|---|---|
| 6,215,783 B1 | 4/2001 | Neyman |
| 6,282,270 B1 | 8/2001 | Porter |
| 6,314,176 B1 | 11/2001 | Gunasekar |
| 6,366,658 B1 | 4/2002 | Bjornberg et al. |
| 6,438,601 B1 | 8/2002 | Hardy |
| 6,512,818 B1 | 1/2003 | Donovan et al. |
| 6,594,269 B1 | 7/2003 | Polcyn |
| 6,598,078 B1 | 7/2003 | Ehrlich et al. |
| 6,636,587 B1 | 10/2003 | Nagai et al. |
| 6,704,394 B1 | 3/2004 | Kambhatla et al. |
| 6,766,371 B1 | 7/2004 | Hipp et al. |
| 6,807,254 B1 | 10/2004 | Guedalia et al. |
| 6,865,266 B1 | 3/2005 | Pershan |
| 7,058,730 B2 | 6/2006 | Harbin |
| 7,313,131 B2 | 12/2007 | O'Connor |

RELEASE LINK TRUNKING FOR IP TELEPHONY

This application is a continuation of U.S. application Ser. No. 10/756,399, filed Jan. 14, 2004, the entire contents of which is incorporated herein by reference.

TECHNICAL FIELD

The invention pertains to voice communications networks. In particular, the invention pertains to calls that originate and terminate outside of Internet Protocol (IP) address space, but use the IP address space to perform processing or services during call setup.

BACKGROUND OF THE INVENTION

IP telephony is a relatively new advancement in telecommunications technology. Over time many end-users are expected to make a transition from a traditional Public Switched Telecommunications Network (PSTN) to IP telephony networks. In the immediate future, a majority of telephone traffic will both originate and terminate on the PSTN. When providing services to such calls from the IP address space, such as, for example, call control and billing services, calls will be routed from the PSTN to the IP address space for one or more services and will be terminated in the PSTN address space.

Current methods for routing calls from the PSTN address space to the IP address space are inefficient in that they unnecessarily use more resources than required. A method for more efficiently routing calls that originate and terminate in the PSTN address space, but require one or more services in the IP address space is needed.

SUMMARY OF THE INVENTION

A method and system are provided that use resources more efficiently for calls that originate and terminate in a first address space, but use services in an IP address.

In one aspect of the invention, a call is established from an originator in a first address space, outside of an IP address space, to an IP device within the IP address space. The IP device sends a message to a switch in the first address space indicating a new destination in the first address space. The established call is released and a second call is established from the originator in the first address space to the destination in the first address space.

In another aspect of the invention, a first leg of a call, originating from a first address space, is established to an IP device in an IP address space. A second leg of a call is established, originating from the IP device in the IP address space to the first address space. The first and second call legs are bridged and the first and second legs of the calls are released from the IP device, such that resources of the IP device are not used for the bridged call.

In a third aspect of the invention, a gateway is configured to send and receive messages using a first protocol in a first address space and configured to send and receive messages using a second protocol in an IP address space. An IP device located within the IP address space is configured to communicate with the gateway. The IP device is further configured to send a first message to the gateway requesting that a call be setup between an originator in the first address space and a destination in the first address space. An indicator for the destination is included in the first message and is based on information received over an established call to the IP device from the originator. The gateway is configured to request release of resources of the established calls, translate the first message in the first protocol to a second message in the second protocol and send the second message to a device in the first address space.

In a fourth aspect of the invention, a computer-readable medium that stores instructions executable by one or more processors to perform a method for release trunking for calls originating and terminating outside of an IP address space is provided. The computer-readable medium includes: instructions for receiving a request for a call to an IP device from a device in a first address space; instructions for saving an indication of an originator of the call; instructions for translating the request for the call from a first protocol to a second protocol and for sending the request in the second protocol to the IP device; instructions for receiving from the IP device a message in the second protocol requesting a second call to be established to a new destination; instructions for translating the message requesting the second call to the first protocol and inserting the indication of the originator into the message; and instructions for sending the message to the first address space.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

Embodiments of the invention may be implemented in hardware, software, or firmware. The firmware may be in a Read-Only Memory (ROM) and the software may reside on, for example, a medium such as a floppy disk, optical disk, or CD ROM.

Figure 1:
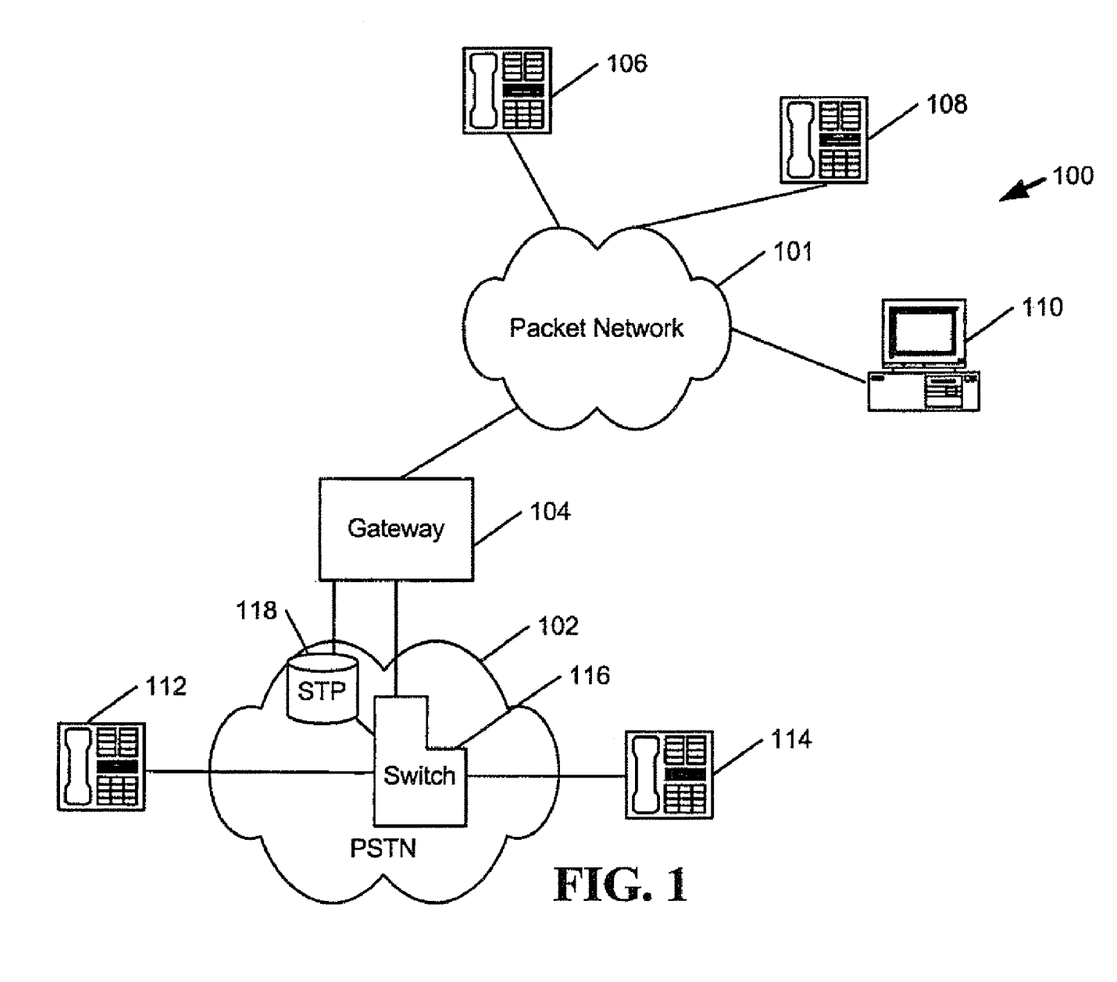
FIG. 1 depicts an exemplary system consistent with the principles of the invention.

FIG. 1 illustrates an exemplary system diagram of an implementation consistent with the principles of the invention. System 100 includes a packet network 101, which may use the Internet Protocol (IP) suite of protocols, a Public Switched Telephone Network (PSTN) 102, telephones, such as Session Initialize Protocol (SIP) phones 106 and 108, a SIP client or proxy 110, which may be a device with one or more processors, such as a computer, telephones 112 and 114 connected to telephone switch 116 and gateway 104 connecting PSTN 102 with packet network 101. PSTN 102 may include a Signal Transfer Point (STP) 118 to relay SS7 messages between network devices. While system 100 has been shown to include certain devices, in other implementations consistent with the principles of the invention, system 100 may include more, fewer, or different devices.

Figure 2:
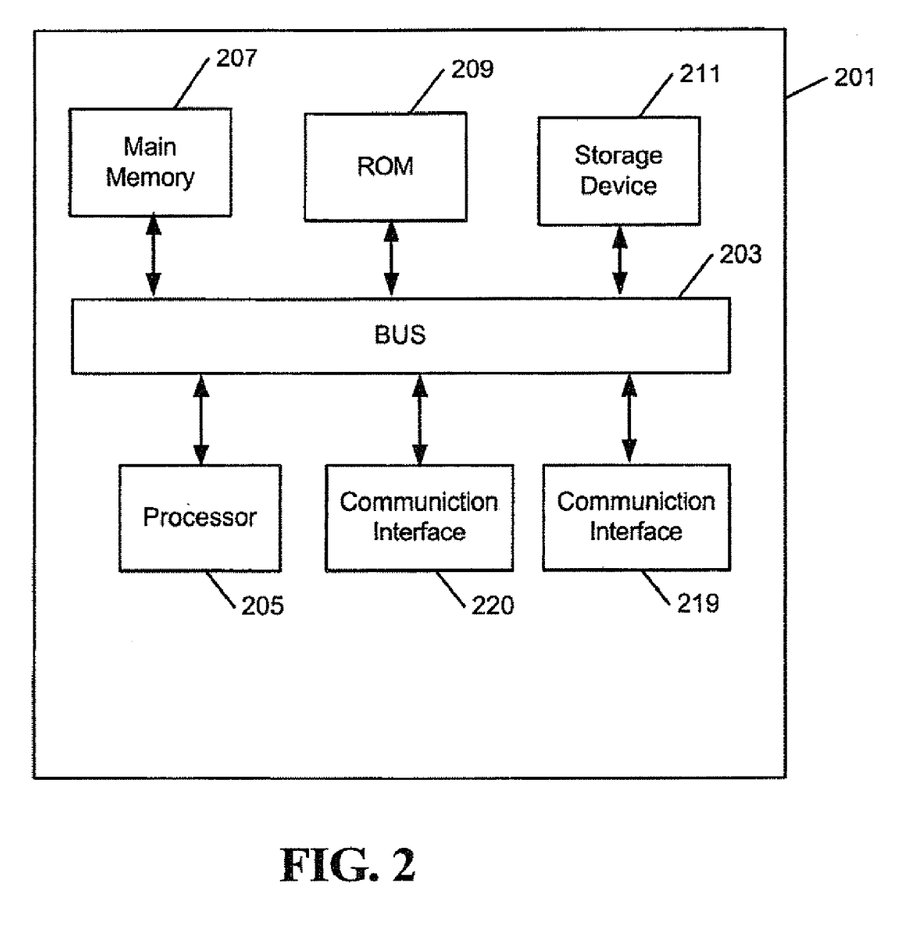
FIG. 2 depicts an exemplary computer system upon which a gateway may be implemented.

FIG. 2 illustrates a computer system 201 upon which implementations of IP gateway 104, according to the present invention, may be implemented. Computer system 201 may include a bus 203 or other communication mechanism, a processor 205 coupled with bus 203, a main memory 207, such as a random access memory (RAM) or other dynamic storage device, coupled to bus 203, a read only memory (ROM) 209 or other static storage device coupled to bus 203, a storage device 211, such as a magnetic disk or optical disk, coupled to bus 203, and communication interfaces 219 and 220 coupled to bus 203.

Main memory 207 may be used to store information and instructions to be executed by processor 205. Main memory 207 may also be used to store temporary variables or other intermediate information during execution of instructions by processor 205.

ROM 209 or other static storage device may be used to store information and instructions for processor 205.

Storage device 211 may include a magnetic disk or optical disk and is provided to store information and instructions.

Communication interface 219 may provide a two-way data communication coupling to a network link that is connected to an IP network, such as packet network 101. For example, communication interface 219 may be a network interface card to attach to any packet switched local area network (LAN).

Communications interface 220 may provide two-way communication to a PSTN network, such as PSTN 102. For Example, communications interface 220 may be a common telecommunications interface such as DS0, DS1, DS3, T1, T3, OC3, OC12, OC48, or OC192.

Execution of the sequences of instructions contained in main memory 207 causes processor 205 to perform the process steps described herein. One or more processors in a multi-processing arrangement may also be employed to execute the sequences of instructions contained in main memory 207. In alternative embodiments, hardwired circuitry may be used in place of or in combination with software instructions. Thus, embodiments are not limited to any specific combination of hardware circuitry and software.

Further, a Sessions Initiation Protocol (SIP) and a Signaling System 7 Protocol (SS7), as well as the instructions to transmit and receive SIP messages and SS7 messages may reside on a computer-readable medium. The term "computer-readable medium" as used herein refers to any medium that participates in providing instructions to processor 205 for execution. Such a medium may take many forms, including but not limited to, non-volatile media, volatile media, and transmission media. Non-volatile media includes, for example, optical or magnetic disks, such as storage device 211. Volatile media includes dynamic memory, such as main memory 207. Transmission media includes coaxial cables, copper wire and fiber optics, including the wires that comprise bus 203. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, a DVD ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 205 for execution. For example, the instructions may initially be carried on a magnetic disk of a remote computer. The remote computer can load the instructions relating to the transmission of SIP messages or SS7 messages into its dynamic memory. The instructions received by main memory 207 may optionally be stored on storage device 211 either before or after execution by processor 205.

Figure 3:
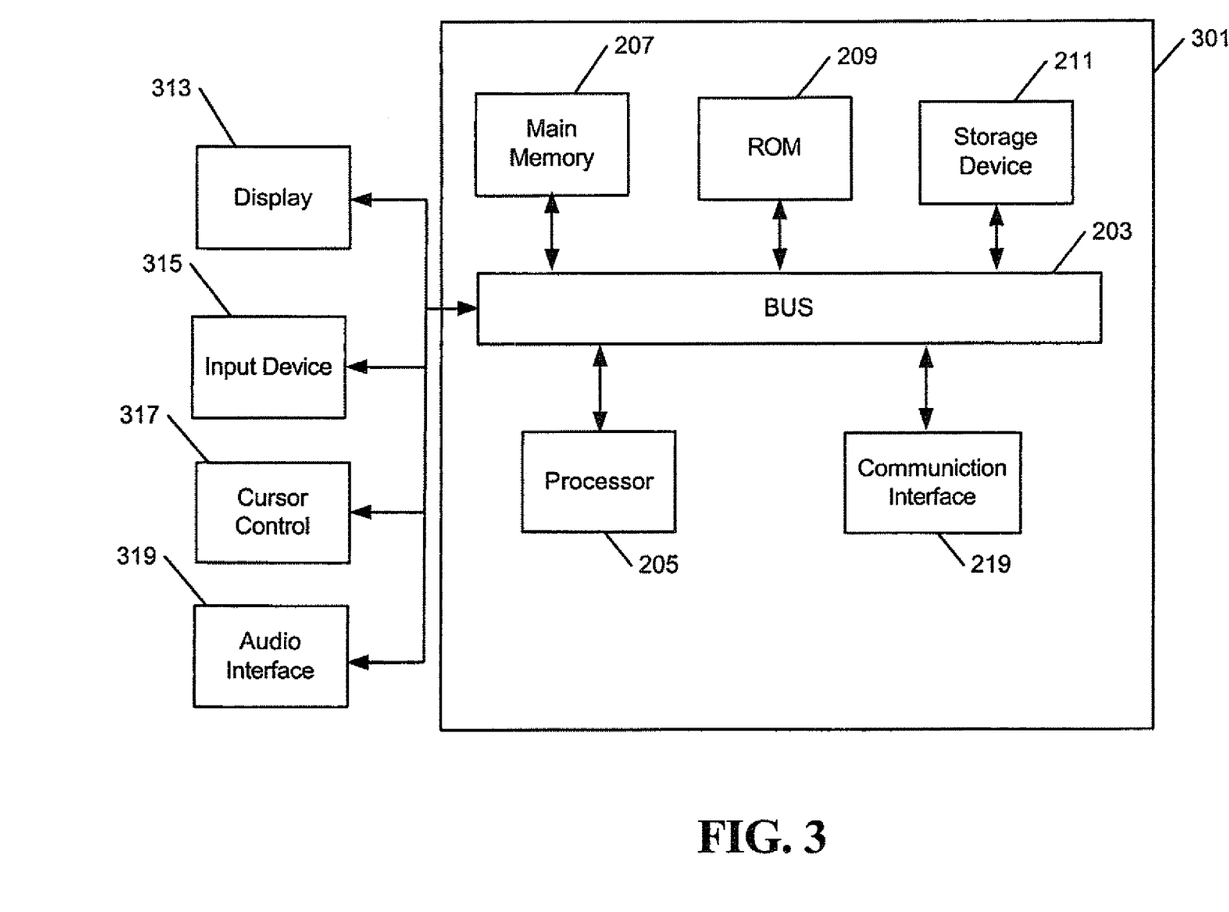
FIG. 3 depicts an exemplary computer system upon which an IP device may be implemented.

FIG. 3 illustrates an exemplary computer system 301 upon which implementations of an IP device, such as a client or proxy 110, or a device used by a SIP operator according to the present invention, may be implemented. Computer system 301 may have many of the same components as computer system 201. Further, computer system 301 may be coupled via bus 203 to a display 313, such as a cathode ray tube (CRT), for displaying information to a computer user. An input device 315, including alphanumeric and other keys, may be coupled to bus 203 for communicating information and command selections to processor 205. Another type of user input device is cursor control 317, such as a mouse, a trackball, or cursor direction keys for communicating direction information and command selections to processor 205 and for controlling cursor movement on display 313. An audio interface 319 may be used to provide one or two-way audio, for example to a human operator. Audio interface 319 may also be used for automated purposes, such as playing and recording sounds and tones.

Figure 4A:
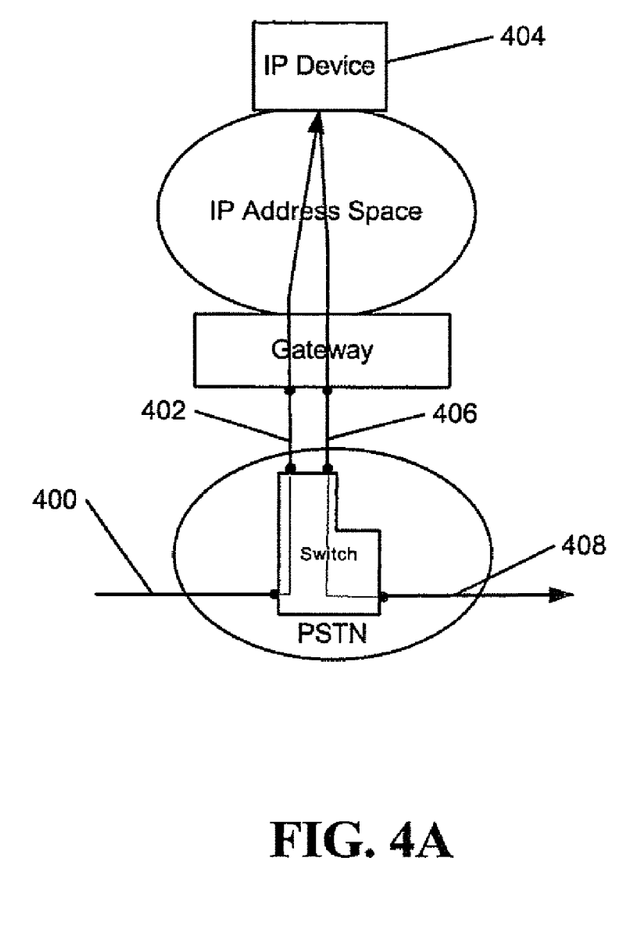
FIGS. 4A and 4B illustrate a technique for rerouting calls from an IP device.
Figure 4B:
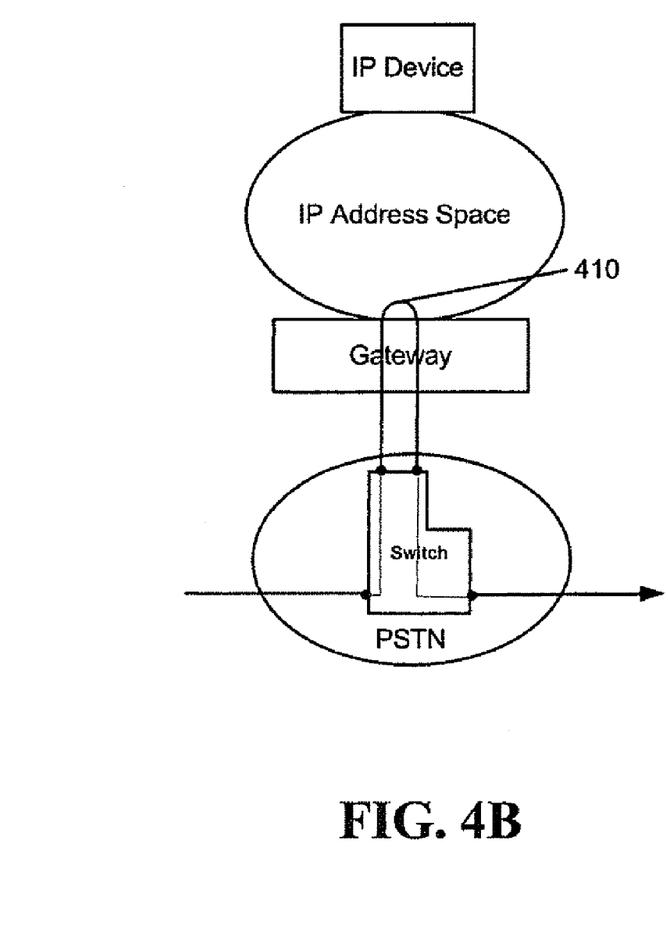

FIGS. 4A and 4B illustrate exemplary call establishment from an originator, such as telephone 112 connected to PSTN Telephone Switch 116 to a destination in PSTN 102, such as telephone 114, using services, such as call processing services, in an IP address space, such as packet network 101. A caller places a call using, for example, telephone 112, to a number corresponding to an address or set of addresses of IP devices in IP address space, such as SIP client or proxy 110 connected to packet network 101 or a SIP operator using a SIP phone such as SIP phone 106 or 108 or similar equipment (400). PSTN 102 routes the call request through a telephone switch 116, which forwards the call request to an IP gateway, such as gateway 104 (402). The IP gateway then sends the call request to the IP device, such as device 110 (404).

SIP client or proxy 110 or SIP operator using a SIP phone or similar equipment may request information from the caller in order to set up the call to the final destination. The type of information requested may concern services such as a calling card call from the caller or may concern any other type of call services or processing. Alternatively, a device within the PSTN address space, such as an Intelligent Network enabling routing translations may provide destination information to SIP client or proxy 110 or SIP operator. After receiving the information, the IP device, for example, device 110, establishes a call to the final destination, for example telephone 114, by forwarding the call request through the IP gateway 104 to telephone switch 116 (406), which further forwards the call request to a destination or terminator (408). At this point, the use of resources at the IP device is no longer needed. The IP device releases the call; however, the gateway sets up a "loop back" or a "hair pin" (410; FIG. 4B) such that, from the callers perspective the call is set up to the intended destination, but two telephone switch ports on telephone switch 116 remain used, as well as two Time Division Multiplexing (TDM) gateway ports, and other IP gateway resources, for the duration of the call. Thus, four TDM ports and transport facilities (402 and 406) as well as processing resources on IP gateway 104 are unnecessarily tied up for the remainder of the telephone call.

Figure 5:
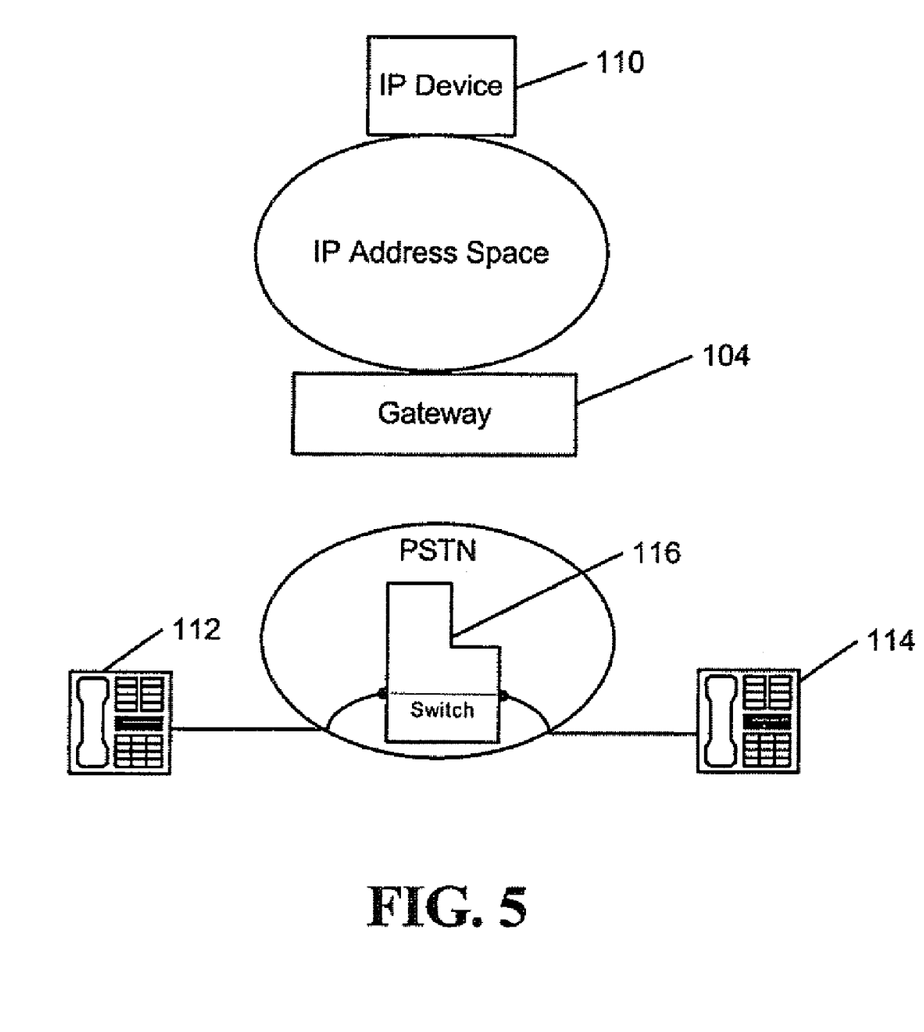
FIG. 5 illustrates a technique for rerouting calls consistent with the principles of the invention.

FIG. 5 illustrates exemplary processing for eliminating the "hair pin" or "loop back". After IP device, for example, device 110, releases the call, gateway 104 communicates with the originating telephone switch 116 to establish the call directly to the destination, for example, telephone 114. IP device 110 then releases all resources that are used for the call and gateway 104 also releases all resources used for the call. Thus, gateway resources and additional telephone switch ports are not used for the call after the call is established to the final destination.

Figure 6:
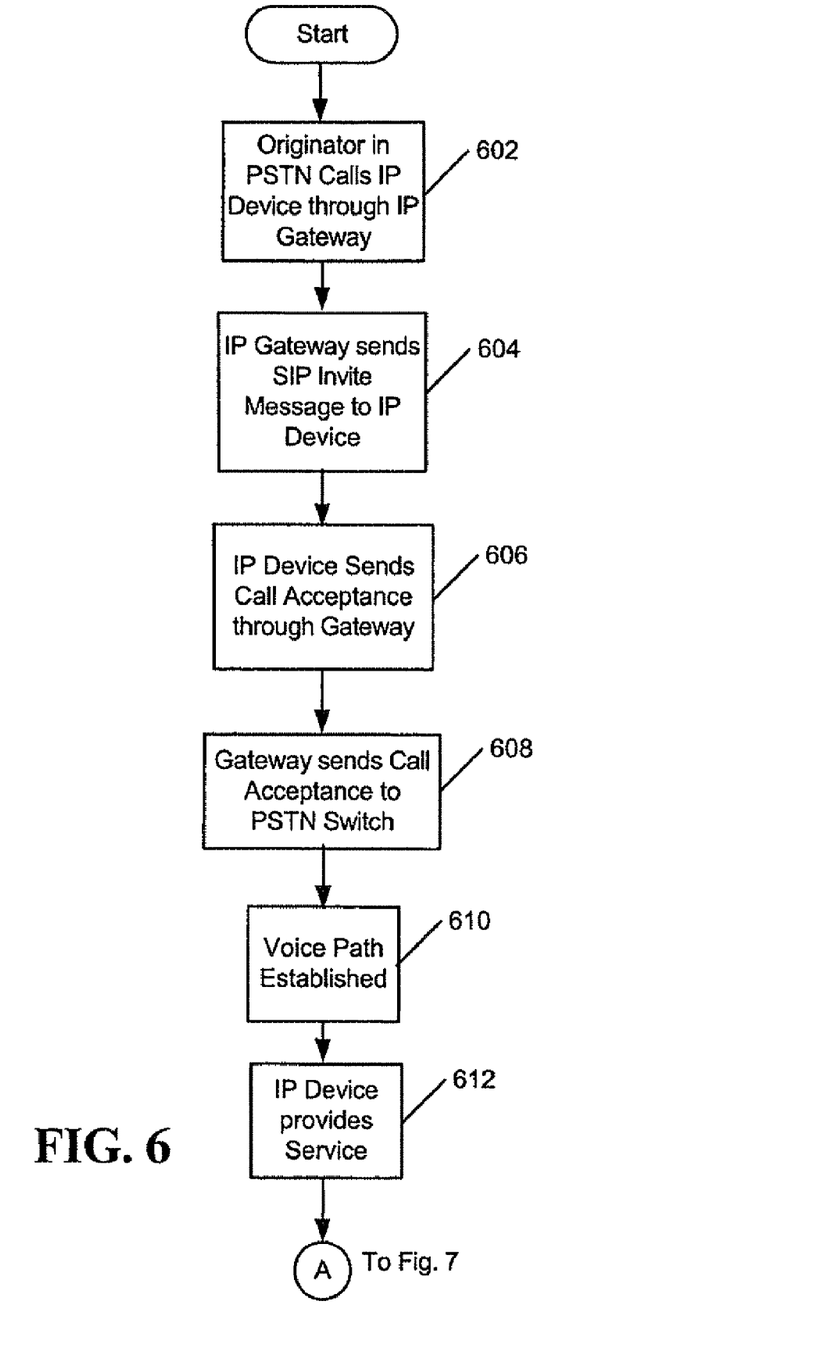
FIGS. 6 and 7 are flowcharts that illustrate processing in a first implementation of the invention.
Figure 7:
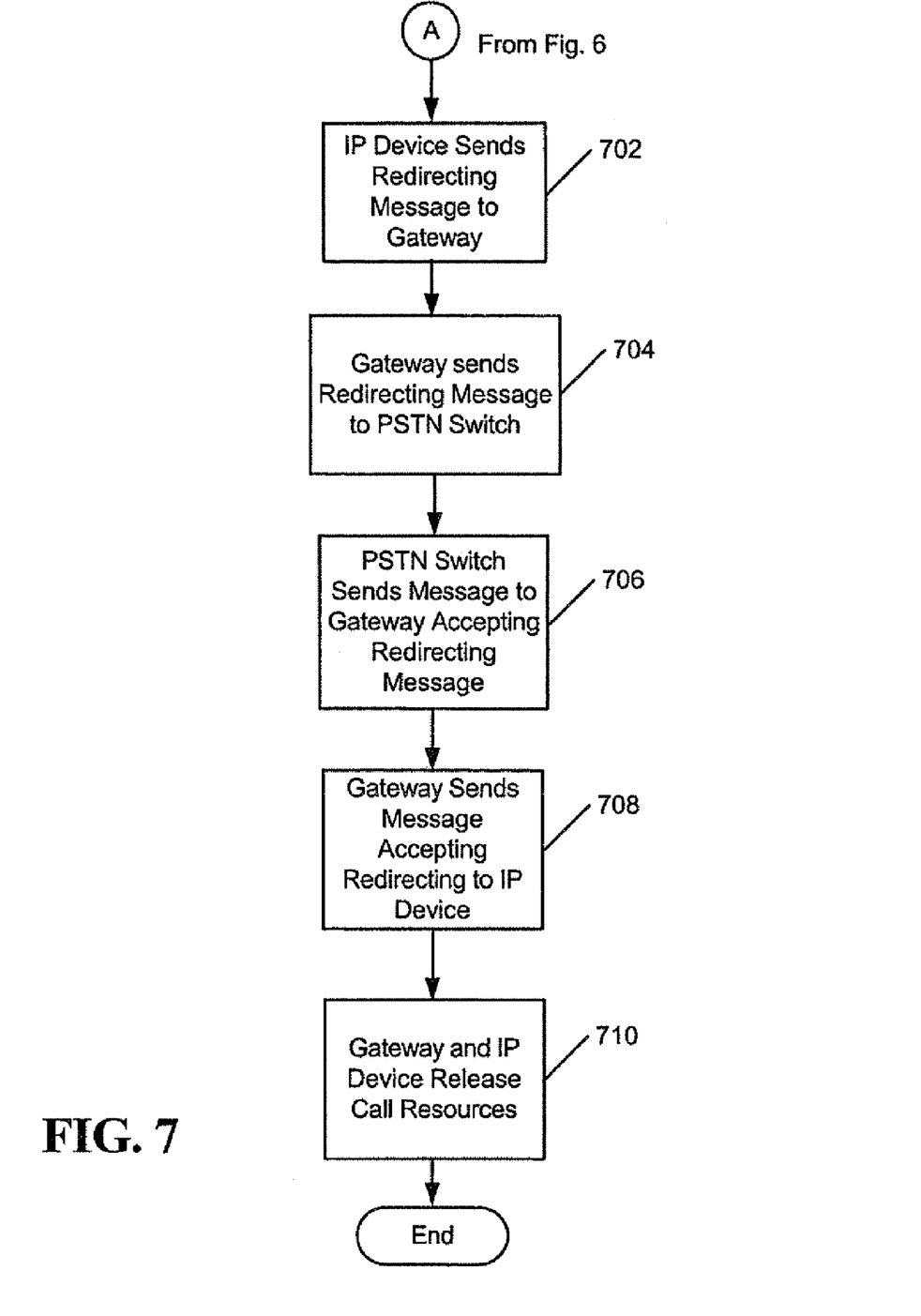

FIGS. 6 and 7 are flowcharts that illustrate exemplary processing in a system, such as system 100, consistent with the principles of the invention. An originator, such as telephone 112, initiates a telephone call through switch 116 resulting in an SS7 Initial Address Message requesting a call to an IP device, such as IP device 110, through IP gateway, for example, gateway 104 in response to a user dialing a number for the IP device at telephone 112 (act 602). Gateway 104 responding to the call request sends a SIP Invite message to IP device 110 (act 604). IP device 110 decides to accept the call and sends call accept messages to originating telephone switch 116 via gateway 104 (acts 606 and 608). Two sets of messages are exchanged. The first set, as indicated by an SS7 Address Complete Message, results in the originating phone 112 sounding a ringing tone and an indication of ringing or service request may be presented to IP device 110. When IP device 110 answers, an SS7 Answer message is transported to the originating telephone switch 116.

At this point, a voice path is established and information may be requested by IP device 110 and sent by originator 112, such as billing information for a calling card call (act 610). IP device 110 may then provide the requested service (e.g., the billing validation) (act 612). IP device 110 sends a redirecting message, including a destination indication, to originating telephone switch 116, via gateway 104 requesting that the call be redirected to the destination (act 702). Gateway 104 then may send an SS7 Facility Request message on the original circuit requesting call redirect (act 704). The telephone switch 116 may accept the Facility Request message, may redirect the call to the destination in PSTN 102, such as telephone 114, and may send a redirecting acceptance message (Facility Accept) to gateway 104 (act 706). Gateway 104 may send the redirecting acceptance message to IP device 110 (act 708) and IP device 110 and gateway 104 may release call resources for the call (act 710).

Figure 8:
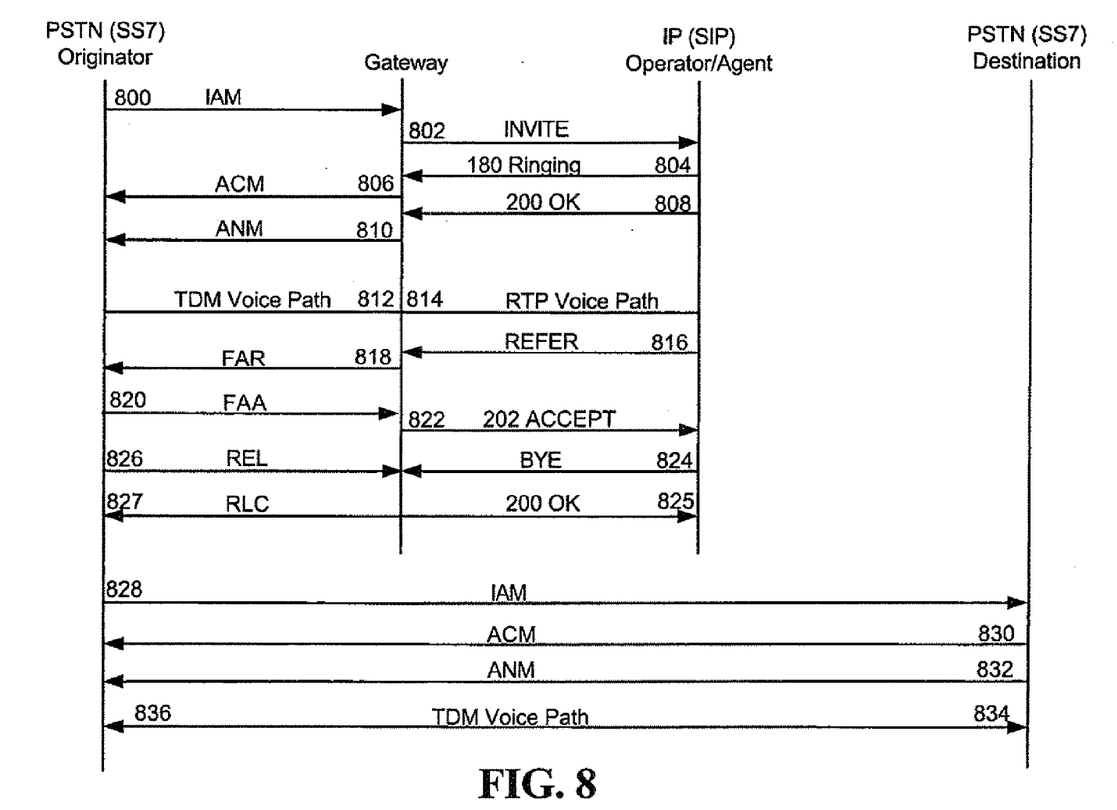
FIG. 8 depicts message flow consistent with the first implementation of the invention.

FIG. 8 is a message flow diagram, which illustrates an exemplary message flow in accordance with the exemplary processing of the flowcharts of FIGS. 6 and 7. In this implementation, messages between telephone switch 116 and IP gateway 104 use the well-known Signaling System 7 (SS7) protocol. Messages between IP gateway 104 and IP device 110 use the well-known Session Initiation Protocol (SIP).

At 800, a user attempts to makes a call from an originator, such as telephone 112, by, for example, dialing a number for services in IP address space. Telephone switch 116 routes the call to gateway 104 using an SS7 Initial Address Message (JAM) to the gateway. The IAM message is a message requesting that a call be established. At 802, gateway 104 saves a Circuit Identification Code (CIC), indicating the source circuit in telephone switch 116, from the IAM message and translates the IAM message to a SIP INVITE message, which it then sends to IP device 110. At 804, IP device 110 sends a call progress signal to the gateway. In this example, the call progress signal is a "180 RINGING" message, which indicates that the telephone is ringing. Gateway 104 translates the "180 RINGING" message to a SS7 Address Complete Message (ACM) and sends the ACM message to telephone switch 116, which provides a ringing signal to originating telephone 112. At 808, IP device 110 answers the call, causing a SIP "200 OK" message to be sent to the gateway 104. Gateway 104 translates the "200 OK" message to a SS7 Answer message (ANM), which gateway 104 sends to telephone switch 116. At 812 and 814, a Time Division Multiplexing (TDM) path and a Real-time Transport Protocol (RTP) voice path are established from the gateway 104 to telephone switch 116 and IP device 110, respectively.

At 816, IP device 110 sends to gateway 104 a SIP "REFER" message requesting that the originator redirect the call to another destination. The "REFER" message includes a new destination telephone number in the PSTN network. Gateway 104 creates a SS7 Facility Request (FAR) message from the SIP "REFER" message and at 818, gateway 104 sends the FAR message to telephone switch 116. At 820, telephone switch 116 sends a SS7 Facility Accept (FAA) message to gateway 104 indicating acceptance of the Facility Request. At 822, gateway 104 converts the FAA message to a SP "202 ACCEPT" message and sends the message to IP device 110 indicating acceptance of the message redirecting the call. At 824 and 826 the call resources on gateway 104 are released by the sending of a SIP "BYE" message and SS7 REL message from BP device 110 and originator 112, respectively. At 825 and 827 a SIP "BYE" message and a SS7 REL message are acknowledged with SIP "200 OK" and SS7 Release Complete (RLC) messages, respectively.

In a very simplistic single telephone switch example, telephone switch 116 would ring telephone 114 to establish communications. In a more realistic example, the destination phone is not located on the same switch and further SS7 call processing is required. At 828, telephone switch 116 sends a SS7 IAM message, requesting a call, to another switch within PSTN 102. At 830, the secondary telephone switch sends an ACM message to telephone switch 116 indicating that the secondary telephone switch received the IAM message and is in the process of handling the call. A ringing tone is provided to telephone 112. At 832, the secondary telephone switch sends a SS7 ANM message indicating that the call is now answered. At 834 and 836, a Time Division Multiplexing path is set up through the PSTN network 102.

Figure 9:
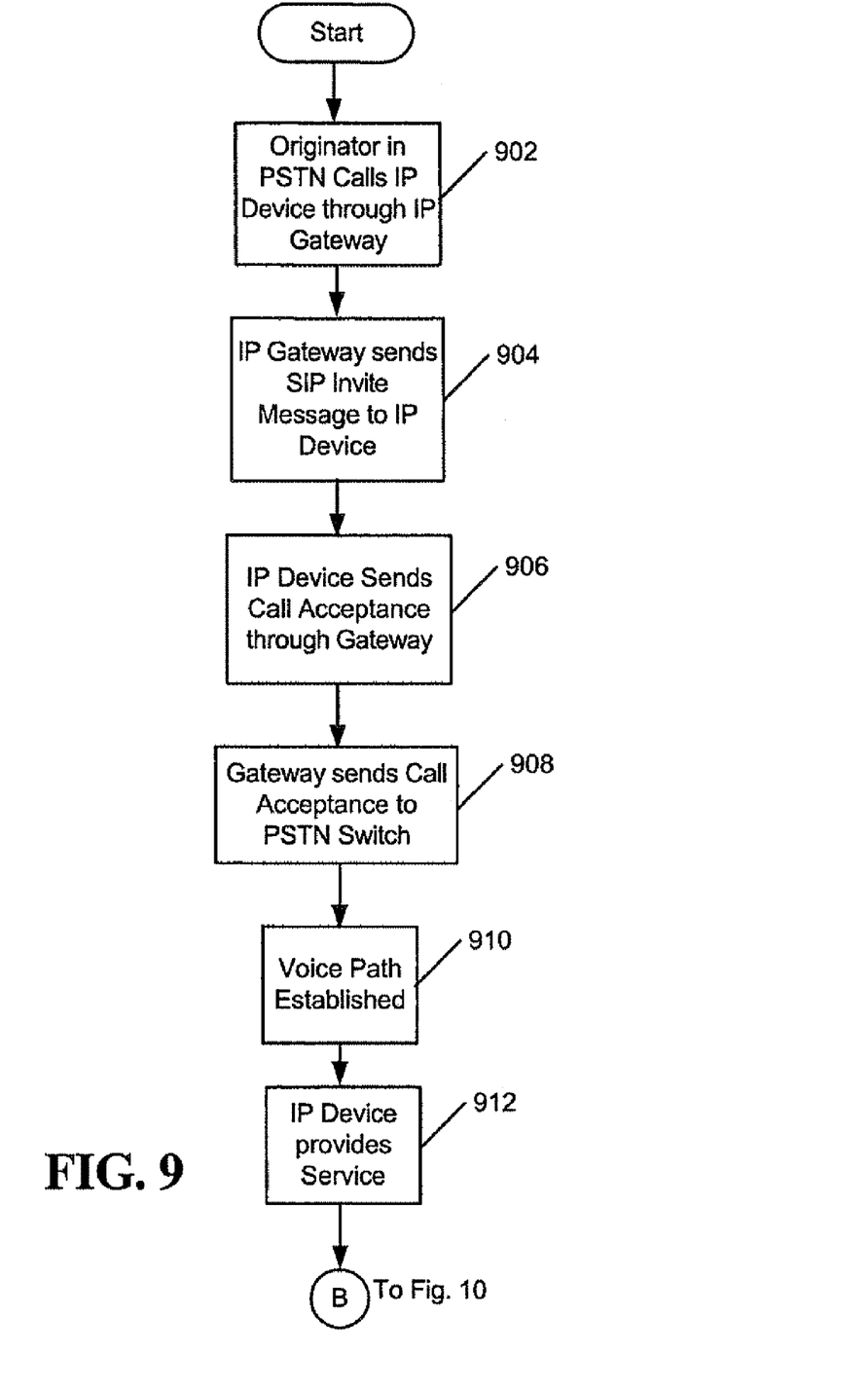
FIGS. 9-11 are flowcharts that illustrate processing in a second implementation of the invention.
Figure 10:
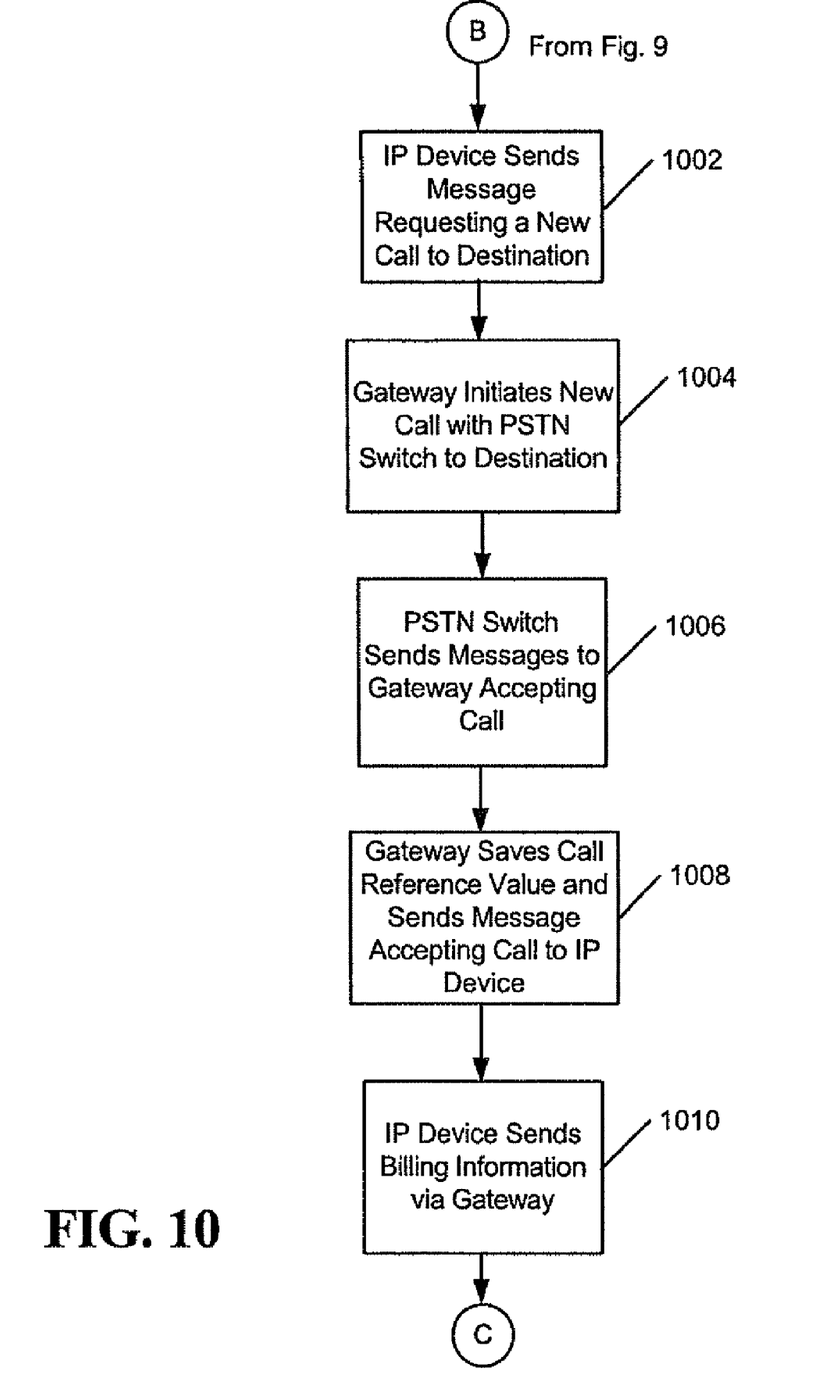
Figure 11:
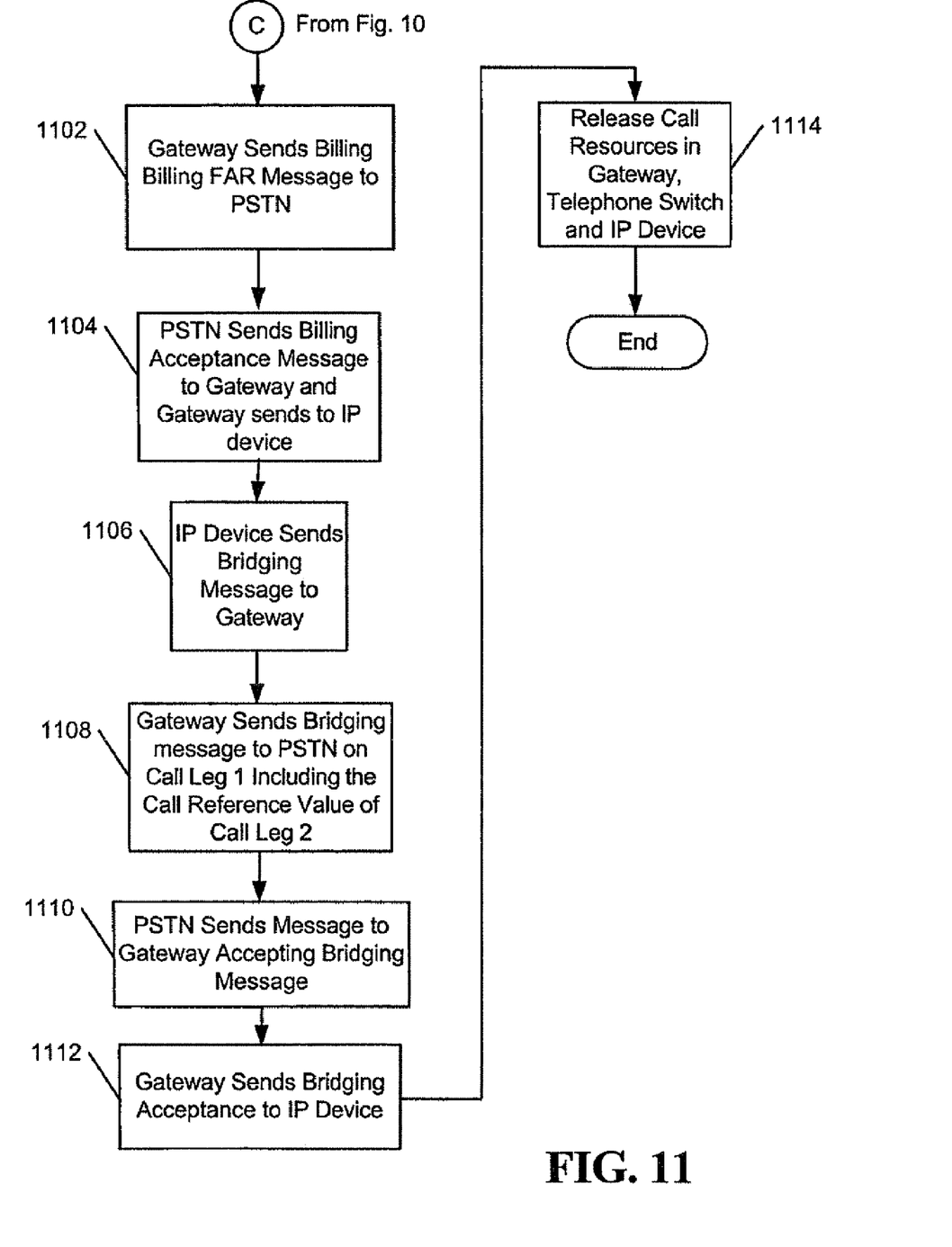

FIGS. 9-11 are flowcharts that illustrate exemplary processing in another implementation of a system, such as system 100, consistent with the principles of the invention. An originator, such as telephone 112, initiates a telephone call through telephone switch 116 resulting in an SS7 Initial Address Message requesting a call to an IP device, such as IP device 110, through IP gateway, for example, gateway 104, in response to a user dialing a number for the IP device at telephone 112 (act 902). Gateway 104, responding to the call request, sends a SIP Invite Message to IP device 110 (act 904). IP device 110 decides to accept the call and sends call accept messages to originating telephone switch 116 via gateway 104 (acts 906 and 908). Two sets of messages are exchanged. The first set, indicated by an SS7 Address Complete Message, results in originating telephone 312 sounding a ringing tone and an indication of ringing or service request may be presented to IP device 110. When IP device 110 answers, an SS7 Answer message is transported to originating telephone switch 116.

At this point, a voice path is established and information may be requested by the IP device and sent by originating telephone 112, such as information for a collect call (e.g., billing information) (act 910). IP device 110 may then provide the requested service, for example, the collect call (act 912).

IP device 110 may send a new call request to the destination via gateway 104 (act 1002). Gateway 104 may send the call request to telephone switch 116 (act 1004). telephone switch 116 may send two call accept messages accepting the call to gateway 102 (act 1006). The first message is an SS7 Address Complete message which indicates a ringing state. Gateway 104 may interpret this message and generate a ringing tone to an agent or phone in the packet network 101. A call reference value is contained within this message which may be saved by gateway 104 and used later to bridge this call leg with the original call leg. The second message is an SS7 Answer message and is used to indicate that the call has been answered in PSTN 102. Gateway 104 may saves the Call Reference Value received in the SS7 Address Complete Message, referring to the destination of the call, and may send the call accept message to IP device 110 (act 1008).

IP device 110 may send billing information via gateway 104 (act 1010). Gateway 104 may send a billing FAR message to telephone switch 116 in PSTN 102 (act 1102). This billing information will be captured on the telephone switch 116 and propagated to billing systems. For example, a unique call ID may be stored that references information collected in the packet network that can later be used to identify the billing records created in PSTN network 102 that include call duration times. Telephone switch 116 may send a billing acceptance message to gateway 104 and gateway 104 may send the billing acceptance to IP device 110 (act 1104).

IP device may send a bridging message to gateway 104 (act 1106). Gateway 104 may send an SS7 Bridging FAR message to the Circuit Identification Code (CIC) that represents call leg 1 (act 1108). This FAR message may contain the Call Reference value of call leg 2 which is to be bridged in telephone switch 116. PSTN 102 sends a bridging acceptance message to gateway 104 indicating that the two call legs are now bridged (act 1110). Telephone switch 116, gateway 104, and IP device 110 may then release call resources (act 1114).

Figure 12:
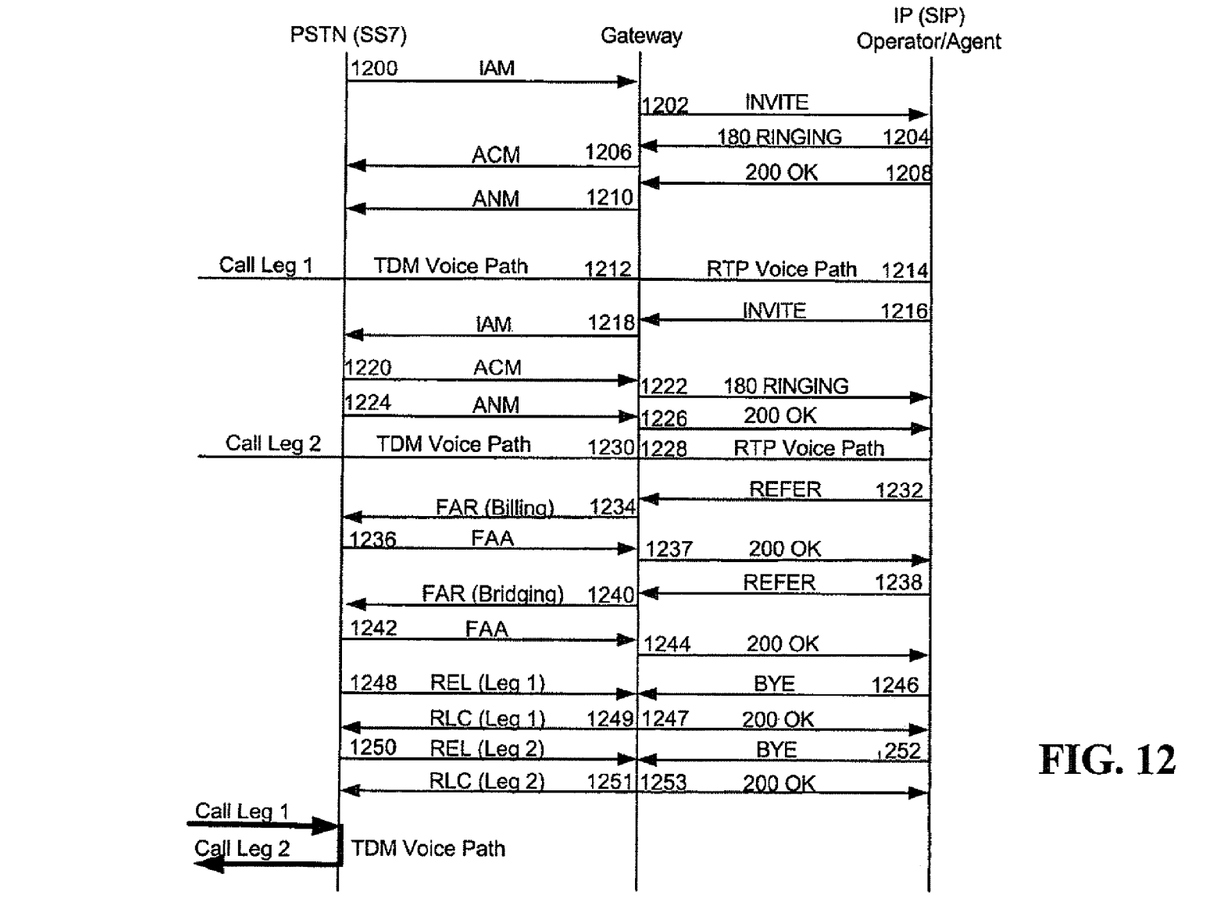
FIG. 12 depicts message flow consistent with the second implementation of the invention.

FIG. 12 is an exemplary message flow diagram consistent with the flowcharts of FIGS. 9-11. A telephone switch on the PSTN receives a call request for a first leg of a call from an originator, such as telephone 112. At 1200, the telephone switch sends a SS7 IAM message (requesting a call) to IP gateway 104. At 1202, the gateway 104 saves the Circuit Identification Code (CIC) included in the IAM message, translates the IAM message into a SIP "INVITE" message and sends the message to IP device 110. At 1204, IP device 110 sends a call progress signal in the form of a SIP "180 RINGING" message to gateway 104, indicating that the phone is ringing. At 1206, gateway 104 translates the "180 RINGING" message to a SS7 ACM message and sends the ACM message to telephone switch 116 in PSTN 102 resulting in a ringing tone being played to telephone 112. At 1208, IP device 110 answers the call and sends a SIP "200 OK" message. The gateway translates the "200 OK" message to an SS7 ANM message at 1210 and sends the message to telephone switch 116 in PSTN 102. At 1212 and 1214, a Time Division Multiplexing (TDM) Voice Path is setup between gateway 104 and telephone switch 116 on the PSTN side of the gateway and a Real Time Transport Protocol (RTP) Voice Path is setup between gateway 104 and IP device 110 on the IP side of the gateway, respectively.

After IP device 110 receives information from originating telephone 112, such as information for a collect call or other call services, IP device 110 initiates a call request for a second leg of the call by sending a SIP "INVITE" message at 1216. At 1218, gateway 104 receives the SIP "INVITE" message, creates an SS7 IAM message for an idle circuit and forwards the message to the destination telephone switch, where it is routed to the destination indicated by the "INVITE" message. At 1220, destination telephone 114 on the PSTN begins to ring and telephone switch 116 sends a call progress signal to gateway 104 in the form of a SS7 ACM message. This message contains a call reference value that will be used later to bridge the two call legs. At 1222, gateway 104 saves the Call Reference Value (indicating destination telephone 114 in PSTN 102) and translates the ACM message to a SIP "180 RINGING" message and forwards the message to IP device 110. At 1224, destination telephone 114 on PSTN 102 answers the call and telephone switch 116 forwards an SS7 ANM message to gateway 104. At 1226, gateway 104 translates the SS7 ANM to a SIP "200 OK" message, indicating that the call has been answered, and forwards the message to IP device 110. At 1228 and 1230, a RTP Voice Path and a TDM Voice Path are setup between gateway 104 and IP device 110 and gateway 104 and PSTN 102, respectively.

At this point, IP device 110 may send billing information to the gateway in a SIP "REFER" message at 1232. At 1234, gateway 104 translates the SIP "REFER" message into a SS7 FAR billing message, which is sent to the CIC of the first call leg from the IAM message at 1200. This FAR message may contain a unique call value that later will allow information collected in packet network 101 to be matched with the billing records produced in telephone switch 116. This is particularly useful to obtain call duration information. At 1236, telephone switch 116 forwards a SS7 FAA message to the gateway indicating acceptance of the billing information. Gateway 104 translates the SS7 FAA to a SIP "200 OK" message and forwards the message to IP device 110 indicating acceptance of the billing information.

At 1238, IP device 110 sends a SIP "REFER" message, indicating a Bridging request to gateway 104 to cause call legs 1 and 2 to be bridged without using the gateway resources or extra resources on the telephone switch. At 1240, gateway 104 receives the SIP "REFER" message and creates an SS7 Bridging FAR message. This message is sent to the CIC received at gateway 104 from telephone switch 116 at 1200 and includes the Call Reference Value received by gateway 104 from the ACM message at 1220. Gateway 104 sends the Bridging FAR message to telephone switch 116. Telephone switch 116 receives the FAR message on the CIC representing call leg 1 and containing a Call Reference Value of call leg 2 enabling telephone switch 116 to bridge both call legs. At 1242, telephone switch 116 sends a SS7 FAA message to gateway 104 informing gateway 104 that the FAR message has been accepted. At 1244, gateway 104 translates the FAA message into a SIP "200 OK" message, indicating that the call is established, and forwards the message to IP device 110. The remaining messages, at 1246 and 1252, include SIP "BYE" messages sent from IP device 110 to gateway 104 and at 1248 and 1250, SS7 REL messages to release the resources for the first and second legs of the call. At 1247 and 1253 the BYE messages are acknowledged with "200 OK" messages. At 1249 and 1251 the SS7 REL messages are acknowledged with SS7 RLC messages. At this point the first and second call legs are bridged and a voice path exists between originating telephone 112 and destination telephone 114 through telephone switch 116 on PSTN 102 without using gateway resources or extra telephone switch ports.

In the above exemplary system, PSTN 102 uses the SS7 protocol and packet network 101 uses the SIP protocol. In other implementations consistent with principles of the invention, Integrated Services Digital Network (ISDN) protocol may be implemented rather than SS7 protocol on PSTN network 102 and H.323 protocol may be implemented rather than SIP on packet network 101.

CONCLUSION

Systems and methods consistent with the present invention provide an efficient method for releasing calls that originate and terminate outside of IP address space, but require call processing or other services of an IP device in IP address space. The foregoing description of the preferred embodiments of the present invention are provided for illustration and description, but is not intended to be limiting or to limit the invention to the precise form disclosed. Modifications and variations are possible in light of the above teachings or may be acquired from practice of the invention for example, while series of acts have been described with regard to FIGS. 6-7 and 9-11, the order of the acts may differ in other implementations consistent with the present invention. Also, non-dependent acts may be performed in parallel.

No element, act or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method comprising:
    establishing, by a device, a call between an originator device, in an address space, and an Internet Protocol (IP) device in an IP address space,
        the address space being outside the IP address space;
    receiving, by the device and from the IP device, a first message identifying a particular destination in the address space;
    sending, by the device, the first message, to a switch in the address space, to request that the call be redirected to the particular destination;
    receiving, from the switch, a second message indicating that the call has been redirected to the particular destination; and
    releasing, by the device and based on receiving the second message, resources for the call established between the originator device and the IP device.

2. The method of claim 1, where the address space includes a Public Switched Telephone Network.

3. The method of claim 1, where the device includes an IP gateway to bridge the address space and the IP address space.

4. The method of claim 1, where sending the first message to the switch includes sending the first message using a Signaling System 7 (SS7) Protocol, and
    where receiving the first message includes receiving the first message using a Session Initiation Protocol (SIP),
    where the method further comprises:
        translating messages between the SS7 Protocol and the SIP
        Protocol, translating the messages including:
            translating the first message, received from the IP device, to a SS7 message.

5. The method of claim 1, where receiving the first message includes:
    receiving a Session Initiation Protocol (SIP) REFER message from the IP device, the SIP REFER message including an indication of the particular destination.

6. The method of claim 1, where sending the first message includes:
    sending a Signaling System 7 (SS7) FAR message including information identifying the particular destination and a Circuit Identification Code (CIC) from the call between the originator device,
        the CIC being saved by the device during the establishing of the call.

7. The method of claim 6, where the SS7 FAR message includes information for billing a user of the originator device, and
    where the switch includes a Public Switched Telephone Network switch.

8. The method of claim 1 where the IP device includes at least one of an IP proxy or an IP client.

9. The method of claim 1, further comprising:
    transmitting call progress messages between the switch and the IP device.

10. The method of claim 1,
    where the IP device determines the particular destination based on information received from the originator device.

11. A system comprising:
    a gateway to:
        receive, from an Internet Protocol (IP) device in an IP address space, a first message requesting that a call, established between the IP device and a particular device in a particular address space, be redirected to a destination in the particular address space,
            the particular address space being different than the IP address space,
        translate the first message to a second message,
        send the second message to another device in the particular address space,
        receive, from the other device, a third message relating to redirecting the call to the destination in the particular address space, and
        release resources of the call established between the IP device and the particular device.

12. The system of claim 11, where the particular address space includes a Public Switched Telephone Network (PSTN),
    where, when sending the second message, the gateway is to communicate over the PSTN using a Signaling System 7 (SS7) protocol, and
    where, when receiving the first message, the gateway is to communicate over the IP address space using a Session Initiation Protocol (SIP).

13. The system of claim 11, where the gateway is to include information identifying the destination in the second message when the gateway translates the first message to the second message.

14. The system of claim 11, where the gateway is further to:
    receive, from the IP device, billing data that is based on billing information collected by the IP device from the particular device, and
    send the billing information to the other device in the particular address space.

15. The system of claim 11, where the gateway is further to send call progress messages between the IP device and the other device.

16. A non-transitory computer-readable medium for storing instructions, the instructions comprising:
    a plurality of instructions which, when executed by a processor, cause the processor to:
        receive a first message from an Internet Protocol (IP) device in an IP address space, a first call being established between the IP device and a particular device in a particular address space that is different than the IP address space, the first message requesting a second call to be established between the particular device and a destination in the particular address space;

translate the first message to a second message that includes information identifying the particular device send the second message to another device in the particular address space; and release the IP device from the first call based on a third message, from the other device, relating to establishing the second call.

17. The non-transitory computer-readable medium of claim 16, where one or more instructions, of the plurality of instructions, to release the IP device from the first call includes one or more instructions to cause resources of the IP device to not be used for the second call.

18. The non-transitory computer-readable medium of claim 16, where the instructions further comprise:

one or more instructions to receive a call progress message from one of the IP device or the other device;

one or more instructions to translate the received call progress message to a translated call progress message; and one or more instructions to send the translated call progress message to another one of the IP device or the other device.

19. The non-transitory computer-readable medium of claim 16, where the instructions further comprise:

one or more instructions to insert information identifying the destination into the second message.

20. The non-transitory computer-readable medium of claim 16, where the information identifying the particular device corresponds to a Circuit Identification Code.

* * * * *